United States Patent Office 3,432,470
Patented Mar. 11, 1969

3,432,470
PROCESS FOR THE PRODUCTION OF POLYOXY-METHYLENES BY CATALYTIC POLYMERIZATION OF MONOMERIC FORMALDEHYDE
Hans von Portatius, Marl, Germany, assignor to Chemische Werke Huls Aktiengesellschaft, Marl, Germany, a corporation of Germany
No Drawing. Filed May 10, 1965, Ser. No. 455,048
Claims priority, application Germany, May 11, 1964, C 32,862
U.S. Cl. 260—67
Int. Cl. C08g 1/20, 1/02
8 Claims

ABSTRACT OF THE DISCLOSURE

A process for the production of polyoxymethylenes comprising adding formaldehyde to an inert solvent maintained at a temperature ranging from $-100°$ to $+90°$ C., said solvent containing an amine polymerization catalyst having at least two amino groups selected from the group consisting of primary-secondary amino groups, primary-tertiary amino groups and secondary-tertiary amino groups. Suitable amines have the following structural formula:

| | | |
|---|---|---|
| (I) | $R_1-NH-R_2-NH_2$ | Secondary-primary. |
| (II) | $R_1-NH-R_2-NH-R_3-NH_2$ | Secondary-secondary-primary. |
| (III) | $\begin{array}{c}R_1\\ \diagdown\\ N-R_2-NH_2\\ \diagup\\ R_4\end{array}$ | Tertiary-primary. |
| (IV) | $\begin{array}{c}R_1\\ \diagdown\\ N-R_2-NHR_3-NH_2\\ \diagup\\ R_4\end{array}$ | Tertiary-secondary-primary. |
| (V) | $\begin{array}{c}R_1\\ \diagdown\\ N-R_2-NH-R_5\\ \diagup\\ R_4\end{array}$ | Tertiary-secondary. | wherein $R_1$, $R_4$ and $R_5$ are aliphatic radicals containing 1 to 18 carbon atoms, and $R_2$ and $R_3$ are selected from the group consisting of ethylidene, propylidene, butylidene and pentylidene radicals.

The present invention relates to the production of polyoxymethylenes by catalytic polymerization of monomeric formaldehyde. More particularly, it relates to the production of polyoxymethylenes by catalysts comprising amines having at least two differently functioning nitrogen atoms in the molecule.

Polymers of formaldehyde, such as polyoxymethylene, have been prepared in various ways, including evaporation of aqueous solutions of formaldehyde. Such methods as the latter, however, are not generally satisfactory and various types of catalytic methods have been tried, many of which have been found to be unsatisfactory for one reason or another.

Among the oldest of the catalytic methods is that of H. Staudinger and W. Kern ("Die hochmolekularen organischen Verbindungen" 1932, pages 280–287), involving the use of aliphatic and aromatic amines. Subsequent to the above disclosure numerous other catalysts were suggested, including: trialkylphosphines, -arsines, and -stibines, carbonyls of Group VIII of the Periodic Table, nickel-oxygen complexes, compounds such as hydrides, mercaptans, salts and Grignard compounds of metals of Groups I to IV of the Periodic Table, hydrazine, quaternary ammonium salts, onium compounds, metal amides, isonitriles, carbodiimide, tetramethylene urea, aluminum oxide or oxyhydrate, amino acids, etc. However, the aliphatic and aromatic amines have remainded of fundamental importance and have repeatedly been modified in various ways for use as catalysts. Examples of such modified amines include N,N,N',N'-tetraalkylalkylenediamines, hexamethylenetetramine and aldehyde ammonias, dialkyltriaminophenols such as 2,4,6-tris-(dimethylamino)-phenol, catalysts containing the structural element

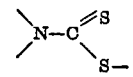

tertiary amines with phenolically substituted alkyl radicals and dihydroxydiamines.

In all of the catalytically active amine catalysts previously described, including those above, which contain two or more active nitrogen atoms in the molecule the nitrogen atoms perform similar functions, all of them being either primary, secondary or tertiary nitrogens with similar functions.

It has now been discovered, according to the present invention, that polyoxymethylenes can be produced in a particularly advantageous manner from monomeric formaldehyde by the introduction of pure monomeric formaldehyde into inert solvents containing as a catlayst amines having in their molecules at least two nitrogen atoms which perform functions different from each other.

Suitable amines have, for example, the following structures:

| | | |
|---|---|---|
| (I) | $R_1-NH-R_2-NH_2$ | Secondary-primary. |
| (II) | $R_1-NH-R_2-NH-R_3-NH_2$ | Secondary-secondary-primary. |
| (III) | $\begin{array}{c}R_1\\ \diagdown\\ N-R_2-NH_2\\ \diagup\\ R_4\end{array}$ | Tertiary-primary. |
| (IV) | $\begin{array}{c}R_1\\ \diagdown\\ N-R_2-NH-R_3-NH_2\\ \diagup\\ R_4\end{array}$ | Tertiary-secondary-primary. |
| (V) | $\begin{array}{c}R_1\\ \diagdown\\ N-R_2-NH-R_5\\ \diagup\\ R_4\end{array}$ | Tertiary-secondary. | wherein $R_1$, $R_4$ and $R_5$ are preferably the same or different aliphatic or cycloaliphatic radicals containing 1 to 18 carbon atoms, as for example, methyl n- and isopropyl, butyl, hexyl, dodecyl and octadecyl radicals, ω-hydroxyhexyl- and λ-hydroxyoctadecyl radicals, cyclopentyl, cyclohexyl and cyclooctyl radicals, while $R_2$ and $R_3$ are the same or different ethylidene propylidene, butylidene or pentylidene radicals.

Suitable amines of the above type include N-methyl-propanediamine - (1,3), N - octylpropanediamine - (1,3), N - cyclohexylbutanediamine - (1,4), N,N - dioxethyl-N' - γ - aminopropanediamine - (1,3), N,N - di - β - cyanoethylbutanediamine - (1,3), N,N - dimethyl - N' - β - cyanoethylpropanediamine - (1,3), N - methyl - N - butylpropanediamine - (1,3), N - methyl - N - ethyloctanediamine-(1,8). Other suitable amines are N-ethylpropanediamine - (1,3), N - n - butylpropanediamine (1,3), N - oxethylpropanediamine - (1,3), N - ethyl - N' - γ - aminopropylpropanediamine - (1,3), N,N' - bis - γ - aminopropylethylenediamine (1,3), N,N - diethylaminopropanediamine - (1,3), N,N - dioxethylpropanediamine - (1,3), and N,N-di-n-butylpropanediamine-(1,3).

Preferred amines of the type useful in carrying out the present invention include: N,N - pentamethylenepropanediamine - (1,3), N,N - dimethyl - N' - γ - aminopropylpropanediamine - (1,3), N,N - diethyl - N' - γ - aminopropylethylenediamine - (1,2), N,N - dimethylpropanediamine-(1,3), and N,N-dibutylbutanediamine-(1,3).

Catalysts of the type disclosed and claimed in the present case show a very high catalytic activity, thus making it possible to convert formaldehyde in a technically efficient manner into polyformaldehyde. In contrast to those amines which have in their molecules only nitrogen atoms that perform the same function, the amines of the present invention do not show any appreciable decrease in their catalytic activity during polymerization at temperatures higher than normally usable with previously known amine catalysts, even though it is generally more economical to effect the polymerization at temperatures above room temperature.

Still another important advantage in the use of the catalysts of the present invention is the fact that in many cases polymers with technically useful chain lengths are immediately produced, Polyformaldehyde, for example with reduced viscosities of 0.7, or lower, for example, are brittle and therefore not useful as plastics. Polyformaldehyde with viscosities of 1.5, or above, possess good mechanical properties, but because of their high melt viscosities, cannot be used for injection molding but can only be cut into shape. Accordingly, the complicated process of polymerization regulation is saved by the use of the catalysts of the present invention.

In carrying out the polymerization process of the present invention, the particular amine of the above type selected for use is first preferably dissolved in an inert solvent and monomeric formaldehyde, containing not more than 40 to 80 p.p.m. of water, 300 p.p.m. methanol and 30 p.p.m. methylal, 10 p.p.m. formic acid, and 20 to 50 p.p.m. methyl formate as impurities, is then added with constant stirring. Polymerization immediately begins upon addition of the formaldehyde, the polymer being precipitated continuously and can be removed by filtration or otherwise, if desired.

The rate of the introduction of the formaldehyde can vary widely and depends largely upon the temperature at which the polymerization is carried out.

The solvents used in the process may be any organic liquid which is chemically inert toward the monomeric formaldehyde solutions used, the polyoxymethylenes formed and the catalysts used. Preferably, the solvent selected should not under normal conditions dissolve more than 3% by weight of the monomeric formaldehyde. Suitable solvents of the above type which can be used in the process of the present invention include aliphatic hydrocarbons such as pentane, hexane and heptane, as well as mixtures thereof including gasoline, and mixtures of the aliphatic hydrocarbons with aromatic hydrocarbons such as benzene or toluene, provided such mixtures do not contain aromatic hydrocarbons in amounts substantially in excess of 50% by weight.

The temperature at which the polymerization is effected may vary within wide limits, as for example, from −100° to +90° C. For economic reasons, however, it is generally preferred to operate at temperatures within the range −20° and +60° C.

The amines used as polymerization catalysts in accordance with the present invention can be produced in good yields by single or multiple stage cyanethylation of primary or secondary amines with subsequent hydrogenation. Most of the preferred amines, therefore, have propane groups between the individual nitrogen atoms. The number of carbon atoms between the individual nitrogen atoms that function differently is of little importance from the point of view of their catalytic activity, but of much greater importance is the presence of the two nitrogen atoms which are bonded differently.

The amount of catalyst required for efficient polymerization can vary widely but preferably the polymerization if effected with from 0.2 to 0.0001 molar percent of catalyst, based on the weight of the monomeric formaldehyde.

The catalyst can be introduced into the reaction vessel either as such or in solution form, preferably in the inert solvent to be used in the operation.

The specific examples given below are for the purpose of illustrating the invention. It will be understood, however, that the procedures set forth therein can be varied in different ways obvious to one skilled in the art and that any such variation that does not depart from the basic concept of the invention disclosed herein is intended to come within the scope of the appended claims.

Example I 600 g. of commercial formaldehyde were first purified by heating for 3 hours at 85° to 130° C. with 270 g. of phosphorus pentoxide and 750 ml. of paraffin oil with stirring and exclusion of oxygen. The resulting pyrolysis gases were first passed through a vertical Dimroth cooler and then into a 3-stage cooling system operating at temperatures of −30°, −30° and −60° C. In the first and second stages there was extensive purification of the monomeric formaldehyde by prepolymerization, while in the third cooling stage the monomeric formaldehyde was obtained as a water-clear liquid of a purity as high as 99.9% by weight.

During a period of 1 hour 7 moles of pure formaldehyde were conducted into a reaction vessel containing 4000 ml. of a hexane fraction containing the catalyst shown in Table I below in the concentration specified, while vigorously stirring and maintaining the temperature at 20° C. by cooling during the period of polymerization. The polymer formed precipitated and was removed by filtration, washed several times with hexane and finally dried under vacuum at +60° C. The yield was then determined and the viscosity of the product measured. In those cases where the viscosity was in excess of 0.60, the viscosity was measured at 135° C. in an Ostwald viscosometer with a 0.25% solution of polyformaldehyde in dimethylformamide, with an addition of 2% by weight of diphenylamine. When the viscosity was less than 0.60 it was measured with a 0.50% solution of polyformaldehyde in dimethylformamide under nitrogen. The results using various catalysts under the above conditions are shown in Table I.

Table I

Comparison of the catalytic activity between primary and secondary amines and of primary and secondary nitrogen atoms in the molecules thereof.

| | No. | Catalyst | Mol percent (based on weight of monomeric formaldehyde | Yield, Percent | Reduced viscosity |
|---|---|---|---|---|---|
| Primary | 1 | n-Butylamine | 0.2 | 73 | 0.56 |
| | 2 | Sec.-butylamine | 0.2 | 50 | 0.38 |
| | 3 | Tert.-butylamine | 0.2 | 60 | 0.22 |
| Secondary | 4 | Di-n-butylamine | 0.2 | 96 | 0.63 |
| | 5 | Cyclohexylmethylamine | 0.2 | 50 | 0.52 |
| | 6 | Piperidine | 0.2 | 88 | 0.64 |
| | 7 | N-methylaniline | 1.6 | 90 | 0.58 |
| Primary + secondary | 8 | N-methylpropanediamine-(1,3) | 0.1 | 100 | 0.22 |
| | 9 | N-ethylpropanediamine-(1,3) | 0.1 | 100 | 0.30 |
| | 10 | N-n-butylpropanediamine-(1,3) | 0.1 | 100 | 0.40 |
| | 11 | N-oxethylpropanediamine-(1,3) | 0.1 | 99 | 0.34 |
| | 12 | N-ethyl-N'-γ-aminopropylpropanediamine-(1,3). | 0.1 | 98.5 | 0.50 |
| | 13 | N,N'-bis-γ-aminopropylethylenediamine-(1,3). | 0.1 | 98.5 | 0.37 |

Since only the nitrogen atom in each molecule determines the catalytic activity, it is important that the amount of catalyst used in each case be the same for the same amount of monomer. This is illustrated in Table I, for example, by the use of 0.2 molar percent for primary and secondary amines (Nos. 1 to 6) and by the use of 0.1 molar percent for amines containing 2 nitrogen atoms (Nos. 8 to 12). Only when N-methylaniline was used was it necessary to use 1.6 molar percent in order to initiate polymerization.

When amines containing both primary and secondary nitrogen atoms in the molecule were used practically quantitative yields were obtained, whereas with the primary amines the yields were between 50 and 73%, and with secondary amines between 50 and 96%.

Example II 600 g. commercial paraformaldehyde were thermally reacted with 270 g. of phosphorus pentoxide and 750 ml. of paraffin oil for 3 hours at 85 to 130° C. with stirring and exclusion of oxygen.

The resulting pyrolysis gases were purified as described in Example I.

7 moles of the formaldehyde thus purified were conducted into a reaction vessel containing 4000 ml. of a hexane fraction and the catalysts shown in Table I and at the concentrations there shown, while maintaining the temperature at 20° C.

Table II

Comparison of catalytic activity and chain length using tertiary amines and amines containing several nitrogen atoms with different functional activities in the same molecule.

Amines having a tertiary nitrogen function combined with a secondary and/or a primary nitrogen function in the same molecule produce yields of 97 to 100% under comparable conditions, while tertiary amines produce yields ranging from 89 to 95% under comparable conditions. While tertiary amines produce polymers with very high molecular weights (viscosity 1.8 to 2.4), amines with different nitrogen functions in the same molecule produce polymers with molecular weights which are directly within the technically useful range (viscosity 0.7 to 1.9).

As will be seen from experiment 13, a quantitative conversion can be obtained with a concentration of 0.02 molar percent of catalyst where the molecular weight of the polymer is also increased. In contrast to tertiary amines, it is possible when using amines having different nitrogen functions in the same molecule to vary also the molecular weight of the polymer within certain limits by varying the catalyst concentration.

Example III 600 g. commercial paraformaldehyde were heated for 3 hours at 85 to 130° C. with 270 g. of phosphorus pentoxide and paraffin oil while stirring and excluding oxygen. The resulting pyrolysis gases were purified as described in Example I.

7 moles of pure formaldehyde, produced as above described, were passed during a period of 1 hour into a reaction vessel equipped with a thermometer and a reflux cooler and containing 4000 ml. of a hexane fraction and the catalysts shown in Table III, while maintaining the temperature at 40° C.

| | No. | Catalyst | Mol percent (based on weight of monomeric formaldehyde | Yield, Percent | Reduced viscosity |
|---|---|---|---|---|---|
| Tertiary | 1 | Triethylamine | 0.2 | 95 | 2.4 |
| | 2 | Tri-n-butylamine | 0.2 | 93 | 2.5 |
| | 3 | Tri-n-octylamine | 0.2 | 89 | 2.9 |
| | 4 | Piperidine salt of dimethyldithiocarbamic acid. | 0.2 | 93 | 2.4 |
| | 5 | Pyridine | 0.2 | 90 | 1.8 |
| Tertiary+Secondary and/or Primary. | 6 | N,N-dimethylpropanediamine-(1,3). | 0.1 | 99.5 | 1.0 |
| | 7 | N,N-diethylaminopropanediamine(1,3). | 0.1 | 100 | 0.65 |
| | 8 | N,N-dioxethylpropanediamine-(1,3). | 0.1 | 97 | 0.90 |
| | 9 | N,N-di-n-butylpropanediamine-(1,3). | 0.1 | 98 | 0.70 |
| | 10 | N,N-pentamethylenepropanediamine-(1,3). | 0.1 | 100 | 1.2 |
| | 11 | N,N-dimethyl-N'-γ-aminopropylpropanediamine-(1,3). | 0.1 | 100 | 1.08 |
| | 12 | N,N-diethyl-N'-γ-aminopropylethylenediamine-(1,2). | 0.1 | 100 | 0.75 |
| | 13 | N,N-diethyl-N'-γ-aminopropylethylenediamine-(1,2). | 0.02 | 100 | 1.19 |

Table III

Comparison of catalytic activity and viscosity of polymers produced with simple amines and those produced with catalysts containing several nitrogen atoms with different functions in the same molecule.

| No. | Catalyst | Mol. percent (based on monomeric formaldehyde) | Temp. °C. | Yield, percent | Reduced viscosity |
|---|---|---|---|---|---|
| 1 | Di-n-butylamine | 0.2 | 40 | 68 | 1.1 |
| 2 | n-Butylamine<br>Di-n-butylamine | 0.1 > 0.2<br>0.1 | 40 | 53.5 | 1.2 |
| 3 | Triethylamine | 0.2 | 40 | 20.5 | 4.4 |
| 4 | N,N-diethyl-N'-aminopropylethylene-diamine-(1,3) | 0.1 | 40 | 97 | 0.9 |
| 5 | N,N-dimethylpropane-diamine-(1,3) | 0.1 | 40 | 99 | 1.6 |
| 6 | N-methylpropanediamine-(1,3) | 0.1 | 40 | 100 | 1.3 |

The above table shows that at higher temperatures (40° C. instead of 20° C.; see Table I, experiments 1 to 3) simple amines show a strong decline in activity. Amines with different nitrogen activities, however, retain their activity, while reduced viscosities in the technically useful range are produced. The selection of catalyst concentration is made on the basis of comparisons, (as in Table I).

What is claimed is:

1. A process for the production of polyoxymethylenes which comprises adding formaldehyde to an inert solvent maintained at a temperature ranging from −100° C. to +90° C. and containing a polymerization catalyst selected from the group consisting of:

$$R_1-NH-R_2-NH_2$$

$$R_1-NH-R_2-NH-R_3-NH_2$$

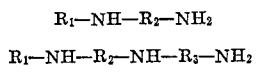

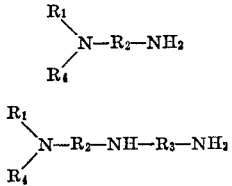

and

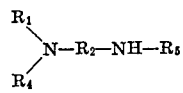

wherein $R_1$, $R_4$ and $R_5$ are aliphatic radicals containing 1 to 18 carbon atoms and $R_2$ and $R_3$ are saturated hydrocarbon radicals selected from the group consisting of ethylidene, propylidene and pentylidene radicals, the catalyst having in the same molecule at least two different kinds of amines selected from the group consisting of primary-secondary, primary-tertiary and secondary-tertiary amines.

2. The process of claim 1, wherein the catalyst is selected from the group consisting of N-methylpropanediamine-(1,3), N-octylpropanediamine-(1,3), N-cyclohexylbutanediamine-(1,4), N,N-dioxethyl-N'-γ-aminopropanediamine-(1,3), N,N-di-β-cyanoethylbutanediamine-(1,3), N,N-dimethyl-N'-β-cyanoethylpropanediamine-(1,3), N-methyl-N-butylpropanediamine-(1,3), N-methyl-N-ethyl-octanediamine-(1,8), N-ethylpropanediamine-(1,3), N-n-butylpropanediamine-(1,3), N-oxethylpropanediamine-(1,3), N-ethyl - N' - γ-aminopropylpropanediamine-(1,3), N,N'-bis-γ-aminopropylethylenediamine-(1,3), N,N - diethylaminopropanediamine-(1,3), N,N-dioxethylpropanediamine-(1,3), N,N-di-n-butylpropanediamine-(1,3), N,N-pentamethylenepropanediamine-(1,3), N,N-dimethyl-N'-γ-aminopropylpropanediamine-(1,3), N,N-diethyl-N'-γ-aminopropylethylenediamine - (1,2), N,N - dimethylpropanediamine - (1,3), and N,N - dibutylpropanediamine-(1,3).

3. The process of claim 1, wherein the inert solvents are selected from the group consisting of aliphatic hydrocarbons, mixtures thereof, and mixtures of aliphatic hydrocarbons and aromatic hydrocarbons which contain not in excess of 50% by weight of aromatic hydrocarbons.

4. The process of claim 2 wherein the catalyst is N,N-pentamethylenepropanediamine-(1,3).

5. The process of claim 2 wherein the catalyst is N,N-dimethyl-N'-γ-aminopropylpropanediamine-(1,3).

6. The process of claim 2 wherein the catalyst is N,N-diethyl-N'-γ-aminopropylpropanediamine-(1,2).

7. The process of claim 2 wherein the catalyst is N,N-dimethylpropanediamine-(1,3).

8. The process of claim 2 wherein the catalyst is N,N-dibutylpropanediamine-(1,3).

References Cited

UNITED STATES PATENTS

| | | | |
|---|---|---|---|
| 3,324,083 | 6/1967 | Von Portatius | 260—67 |
| 3,096,306 | 7/1963 | Sidi | 260—67 |
| 3,173,894 | 3/1965 | Hermann et al. | 260—67 |

WILLIAM H. SHORT, *Primary Examiner.*

L. M. PHYNES, *Assistant Examiner.*